US010280882B2

(12) United States Patent
Hall et al.

(10) Patent No.: US 10,280,882 B2
(45) Date of Patent: May 7, 2019

(54) FUEL TANK WITH CARBON DIOXIDE STORAGE

(71) Applicants: David R. Hall, Provo, UT (US); Stephen R. Hall, Draper, UT (US)

(72) Inventors: David R. Hall, Provo, UT (US); Stephen R. Hall, Draper, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 15/131,498

(22) Filed: Apr. 18, 2016

(65) Prior Publication Data

US 2017/0298880 A1    Oct. 19, 2017

(51) Int. Cl.
| B01D 53/22 | (2006.01) |
| F02M 37/00 | (2006.01) |
| F02M 21/02 | (2006.01) |
| B60K 15/03 | (2006.01) |
| B01D 53/62 | (2006.01) |
| B60K 13/04 | (2006.01) |

(52) U.S. Cl.
CPC ......... *F02M 37/0088* (2013.01); *B01D 53/62* (2013.01); *B60K 13/04* (2013.01); *B60K 15/03* (2013.01); *F02M 21/0206* (2013.01); *F02M 21/0296* (2013.01); *B60K 2015/0344* (2013.01); *B60K 2015/03078* (2013.01)

(58) Field of Classification Search
CPC .......... F02M 21/0296; F02M 21/0206; F02M 37/0088; B60K 15/03; B60K 2015/0344
See application file for complete search history.

(56) References Cited

U.S. PATENT DOCUMENTS

| 1,900,904 | A | * | 3/1933 | Berger | ................ | D06M 16/693 139/420 D |
| 2,177,834 | A | * | 10/1939 | Masson | ................... | G07F 13/00 222/133 |
| 2,365,624 | A | * | 12/1944 | Cantello | ................ | B60K 15/00 137/209 |
| 3,066,482 | A | * | 12/1962 | Rod | ......................... | F02K 9/26 110/185 |
| 3,409,714 | A | * | 11/1968 | Strugar, Jr. | ............ | B60K 15/03 222/105 |
| 4,366,797 | A | * | 1/1983 | Jackson | ................. | F02M 17/20 123/523 |
| 4,455,285 | A | * | 6/1984 | Watkins | ................. | B01J 8/1836 422/146 |
| 4,688,546 | A | * | 8/1987 | Akita | ........................ | F23D 3/18 126/96 |
| 4,909,530 | A | * | 3/1990 | Tsukada | ................. | B60K 13/04 180/296 |
| 4,930,811 | A | * | 6/1990 | Tsukada | ........... | B60K 15/03177 180/69.4 |

(Continued)

*Primary Examiner* — Anthony R Shumate

(57) ABSTRACT

A fuel tank and a motor vehicle equipped to recapture, store and recycle atmospheric carbon dioxide is disclosed. In one embodiment, such a vehicle includes a fuel tank which stores carbon dioxide in a same area with the combustible fuel of the vehicle. The fuel tank may include one or more pistons, baffles, bladders, or fixed dividers to separate carbon dioxide storage from fuel storage within a fuel tank area. The fuel tank may share volumetric space between carbon dioxide and fuel within the fuel tank. The fuel tank may be integrally formed into a carbon fiber vehicle body. The fuel tank may be integrally formed into a frame of a vehicle.

20 Claims, 20 Drawing Sheets

(56) References Cited

U.S. PATENT DOCUMENTS

| | | | | |
|---|---|---|---|---|
| 5,445,015 A | * | 8/1995 | Namiki | F02M 25/0809 123/520 |
| 5,522,417 A | * | 6/1996 | Tomioka | B60K 15/03519 137/202 |
| 5,733,157 A | * | 3/1998 | Okuzawa | B63H 20/245 123/195 P |
| 5,957,113 A | * | 9/1999 | Masaki | F02M 25/089 123/518 |
| 9,764,697 B1 | * | 9/2017 | Kobayashi | B60R 13/0876 |
| 2001/0047788 A1 | * | 12/2001 | Ito | F01M 1/04 123/196 R |
| 2003/0010214 A1 | * | 1/2003 | Naruke | B01D 53/92 96/337 |
| 2004/0020530 A1 | * | 2/2004 | Lai | F16K 17/366 137/38 |
| 2008/0169449 A1 | * | 7/2008 | Mundschau | B01D 69/141 252/373 |
| 2012/0318793 A1 | * | 12/2012 | Uchida | B01D 53/22 220/86.2 |
| 2013/0125528 A1 | * | 5/2013 | Ikeda | F01N 13/002 60/273 |
| 2013/0248272 A1 | * | 9/2013 | Nakamura | B62K 11/02 180/229 |
| 2013/0249251 A1 | * | 9/2013 | Nakamura | B60H 1/26 296/208 |
| 2014/0251713 A1 | * | 9/2014 | Aoyama | B60K 13/04 180/309 |
| 2017/0267190 A1 | * | 9/2017 | Kobayashi | B60R 13/0876 |
| 2017/0282705 A1 | * | 10/2017 | Bowers | B60K 15/03 |
| 2017/0321645 A1 | * | 11/2017 | Liu | F02M 61/166 |

\* cited by examiner

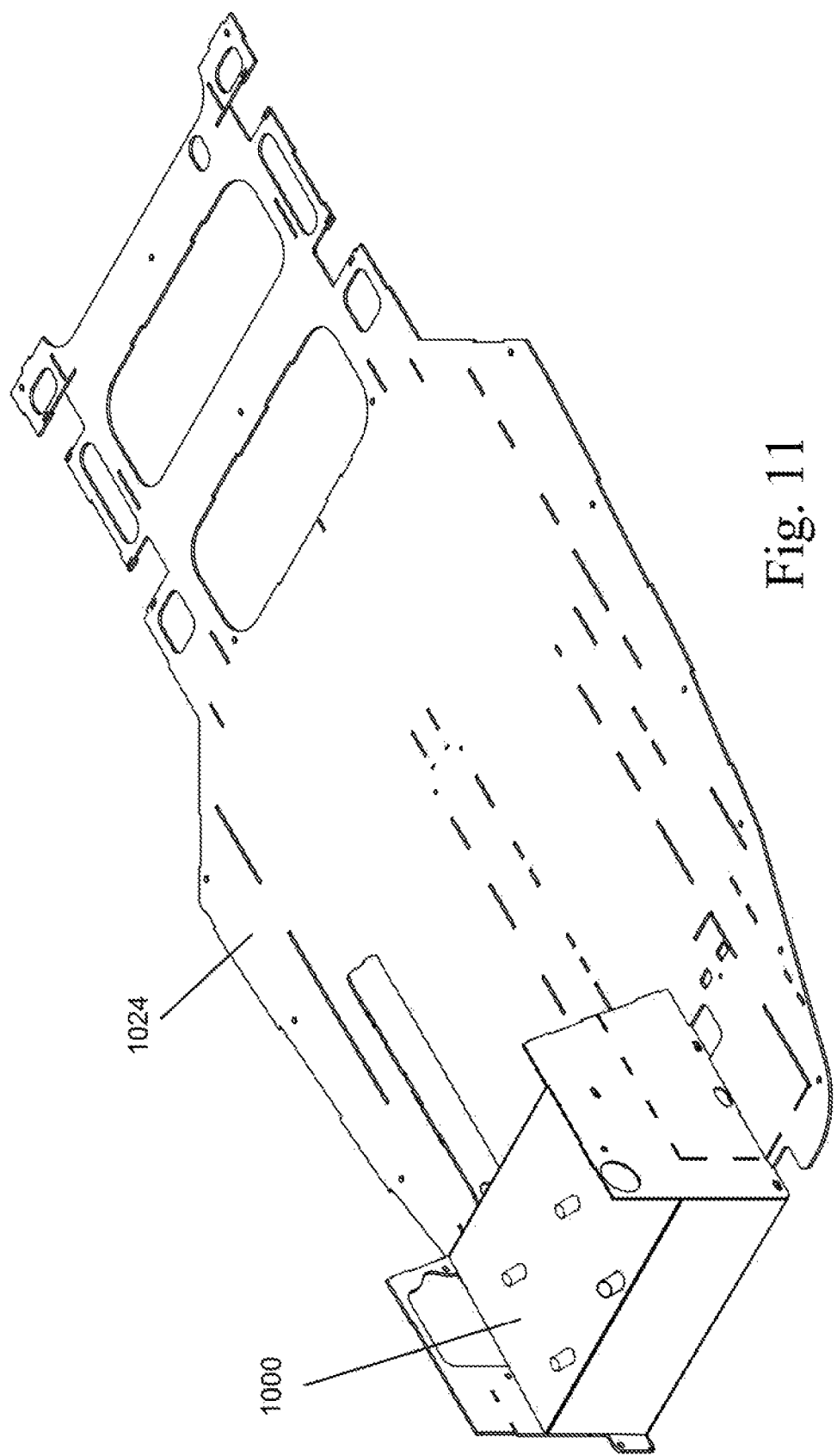

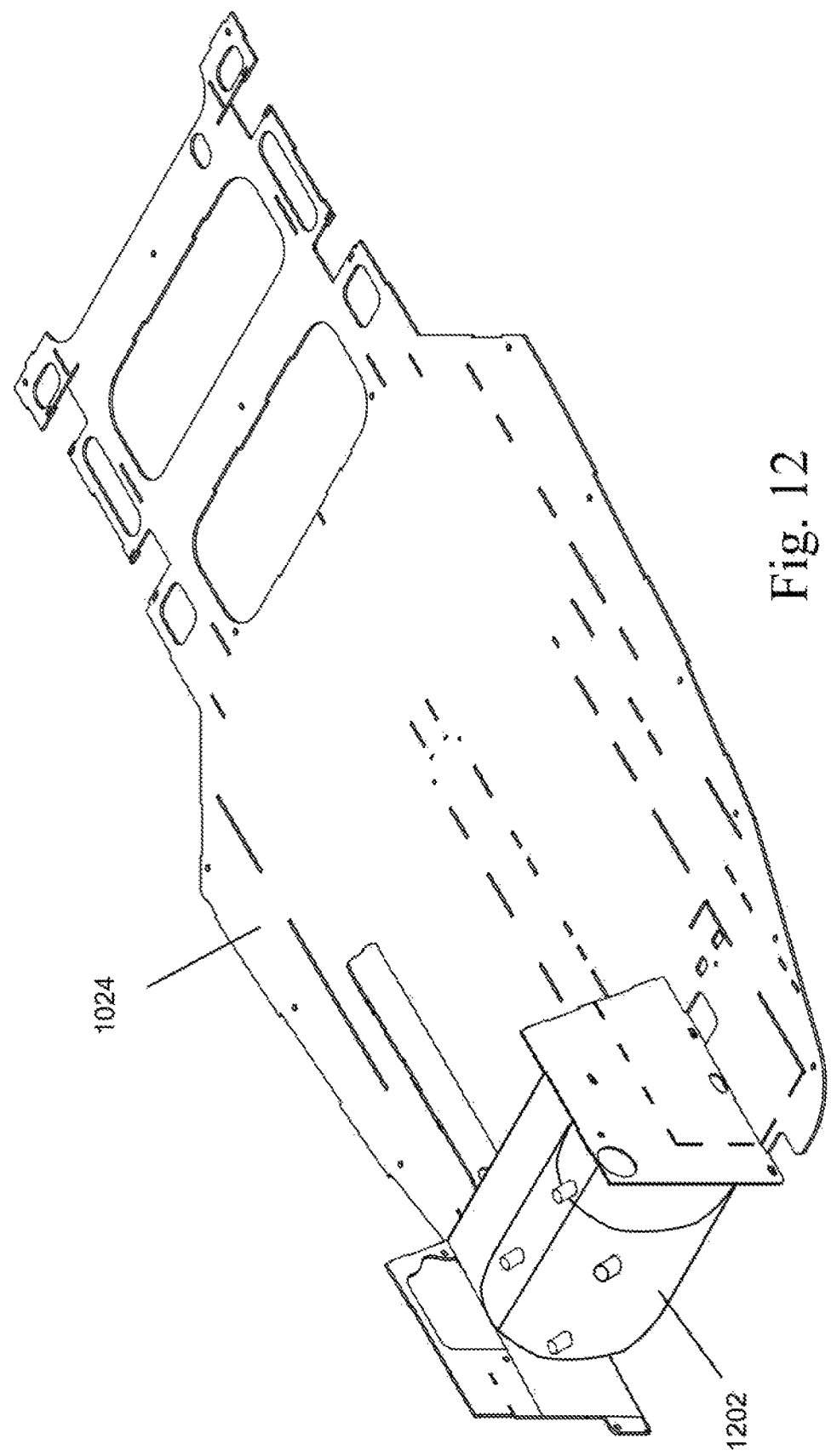

FUEL TANK WITH CARBON DIOXIDE STORAGE

BACKGROUND

Field of the Invention

This invention relates to recapture, storage and recycling of atmospheric carbon dioxide ($CO_2$) using a vehicle and a vehicle fuel tank.

Background of the Invention

Carbon dioxide ($CO_2$) is the primary greenhouse gas emitted through human activities. The main human activity that emits $CO_2$ is the combustion of fossil fuels (coal, natural gas, and oil) for energy and transportation.

The combustion of fossil fuels such as gasoline and diesel to transport people and goods is the second largest source of $CO_2$ emissions, accounting for about 31% of total U.S. $CO_2$ emissions. This category includes transportation sources such as highway vehicles, air travel, marine transportation, and rail.

Carbon dioxide emissions in the United States increased by about 7% between 1990 and 2013. Since the combustion of fossil fuel is the largest source of greenhouse gas emissions in the United States, changes in emissions from fossil fuel combustion have historically been the dominant factor affecting total U.S. emission trends. Changes in $CO_2$ emissions from fossil fuel combustion are influenced by many long-term and short-term factors, including population growth, new technologies, changing behavior, and seasonal temperatures. Transportation emissions contributed to the 7% increase, largely due to an increase in miles traveled by motor vehicles.

Currently, the most effective way to reduce carbon dioxide ($CO_2$) emissions is to reduce fossil fuel consumption. Reducing fossil fuel consumption by regulation of motor vehicle standards is the focus of many governments today. Regulation of motor vehicle standards is helpful but not sufficient to stop the yearly increasing levels of $CO_2$ in the atmosphere. Despite government regulations, $CO_2$ emissions continue to increase at a faster rate each year over the previous year. New systems and methods are needed for recapture and recycling of $CO_2$ emissions.

SUMMARY

The disclosed invention has been developed in response to the need of continually rising atmospheric $CO_2$ concentrations. Accordingly, a vehicle fuel tank and methods of recapture, storage and recycling of atmospheric carbon dioxide ($CO_2$) using a vehicle and a vehicle fuel tank in accordance with the invention have been developed. The disclosed invention provides a way that individuals can help reduce atmospheric $CO_2$ by driving a motor vehicle equipped to recapture, store and recycle atmospheric carbon dioxide. The features and advantages of the invention will become more fully apparent from the following description and appended claims, or may be learned by practice of the invention as set forth hereinafter.

Consistent with the foregoing, a motor vehicle equipped to recapture, store and recycle atmospheric carbon dioxide ($CO_2$) is disclosed. In one embodiment, such a vehicle includes a fuel tank which stores $CO_2$ in a same area with the combustible fuel of the vehicle. The fuel tank may include one or more pistons, baffles, bladders, or fixed dividers to separate $CO_2$ storage from fuel storage within a fuel tank area. The fuel tank may share volumetric space between $CO_2$ and fuel within the fuel tank. The fuel tank may be integrally formed into a carbon fiber vehicle body. The fuel tank may be integrally formed into a frame of a vehicle. The frame members of the vehicle body may include one or more hollowed out metal areas forming a fuel tank of the vehicle. The hollowed out metal areas may form one or more high pressure vessels constituting a vehicle fuel tank with $CO_2$ storage. The fuel tank may provide structural support for vehicle frame and be an integral part therein. A fuel tank may comprise the strongest frame member of a vehicle frame. A vehicle frame may be built starting with a fuel tank and attaching all other frame members thereto. A fuel tank may be modularized and removable from a vehicle front, back, bottom, or side. A modularized tank may be replaced as a refueling and recycling procedure. A refueling and recycling procedure may be accomplished by a delivery driver. The delivery driver may provide mobile vehicle fueling and recycling based on a vehicle fuel state, $CO_2$ fill state, or location. The delivery driver may be able to refill and recycle a vehicle fuel tank without a vehicle owner being present such as when a vehicle owner is at work or shopping or parked at home. The delivery driver may be given a dynamically generated code which generates access to the fuel tank of a vehicle. The dynamically generated code may have global positioning location coordinates (GPS location coordinates) concatenated onto or contained within the dynamically generated code. The code is then able to enable access to a vehicle fuel tank and give a delivery drive GPS coordinates of the vehicle. If the vehicle moves, the dynamically generated code may also change in real-time allowing a delivery driver to track and obtain access to the vehicle fuel tank. A temporary access code for accessing the fuel system may be created using GPS coordinates of the vehicle and a random number generator. If the vehicle moves to a different coordinate the temporary access code may be dynamically changed based on a new GPS coordinate location. This may allow a different delivery driver or company to fill the refilling/recycling order. A delivery driver may be notified that a vehicle needs to be refueled when a vehicle is stationary for a predetermined time period. If a vehicle is traveling and does not have enough fuel to reach a desired destination a fuel delivery driver may be routed to an estimated point or rondeau point along a vehicle route. This may be useful especially for totally autonomous vehicles which need to be refueled by people or an automated system. A delivery driver may have replaceable fuel/recycling modules which can be changed out in less than 2 minutes at any location.

A fuel tank may store and supply more than one type of fuel. The fuel may be one or more of gasoline, diesel fuel, liquefied petroleum gas, liquefied natural gas, compressed natural gas, alcohol, butane, or hydrogen. One or more $CO_2$ recycling tanks or bladders may be contained within the fuel tank. Separately removable pressurized tanks may be contained within a fuel tank. A fuel tank may have fuel added and $CO_2$ discharged at the same time by a dual nozzle-fueling/recycling pump connection to the fuel tank. A $CO_2$ tank may be removable from the vehicle or fuel tank for recycling purposes. A pressurized fuel tank may be removable from the vehicle or fuel tank for fueling purposes.

A vehicle may collect $CO_2$ from the vehicle's exhaust system and compress the exhaust into a fuel tank of the vehicle or other dedicated $CO_2$ storage area. A vehicle may collect atmospheric $CO_2$ which is not the result of the vehicle's combustion and store the $CO_2$ within a fuel tank of the vehicle or other dedicated storage area. A vehicle may collect $CO_2$ from the vehicle's exhaust system and from atmospheric $CO_2$ which is not the result of the vehicle's combustion and store the CO2 in the same CO2 tank within the fuel tank or to another dedicated CO2 storage area. The vehicle may store CO2 from the exhaust in a different CO2 storage from the CO2 collected which was not part of the vehicle's combustion process. The vehicle may provide dispensing of CO2 beverages within the vehicle from CO2 taken out of the vehicle's exhaust and/or out of the atmosphere which was not part of the vehicle's combustion process. The vehicle may provide one or more auxiliary CO2 ports for recycling or using collected CO2.

The CO2 removal process may include parallel and series CO2 scrubbers and/or CO2 membranes to achieve a desired purity and throughput of a vehicle's exhaust system. A vehicle's exhaust system may provide less than 50 part per million CO2 in its exhaust gas after going through one or more scrubbing and/or membrane filtering processes. One or more sensors may determine a part per million count of CO2 in a pre and post exhaust gas processing in order to configure one or more CO2 removal systems for optimal operation based on vehicle speed, combustion air quality, type of fuel, vehicle performance, and CO2 storage levels within a CO2 storage area. A CO2 removal system may include one or more scrubber systems, membrane systems, heat exchange systems, compressor systems, and condenser systems. Compressor systems may need to have one or more compressor stages to reach a desired pressure and volume. Heat exchange systems may need to have heating and cooling capacity provided by a thermal electric module or Peltier module. Heat exchange systems may also be dynamically configured to increase or decrease surface area to achieve a desired temperature and throughput. Scrubber systems may include one or more parallel or series treatment regions or surfaces which may be dynamically configured based on CO2 sensor feedback. Membrane systems may be included within a scrubber or be a separate system providing CO2 filtering. A number of membranes and/or surface area exposure may be dynamically configured to achieve a desired CO2 throughput and purity. An expansion tank may be used to stage and cool exhaust gas as it leaves an engine before processing by a scrubber system. An expansion tank system may allow for accumulation of exhaust gas over a process threshold of the scrubber system. A pre-cooling system may be used to cool exhaust as it leaves the engine. The pre-cooling system may be air cooled, water cooled, or thermal electrically cooled.

A CO2 filter may be used in conjunction with the recovered CO2 to increase a purity factor of the stored CO2. Removable CO2 storage tanks may be used in addition to CO2 stored in a fuel tank or as a standalone CO2 storage.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIGS. 11-14, 15a, 15b, 16a and 16b show various configurations of fuel tanks in accordance with the invention;

DETAILED DESCRIPTION

It will be readily understood that the components of the present invention, as generally described and illustrated in the Figures herein, may be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Figure 1:
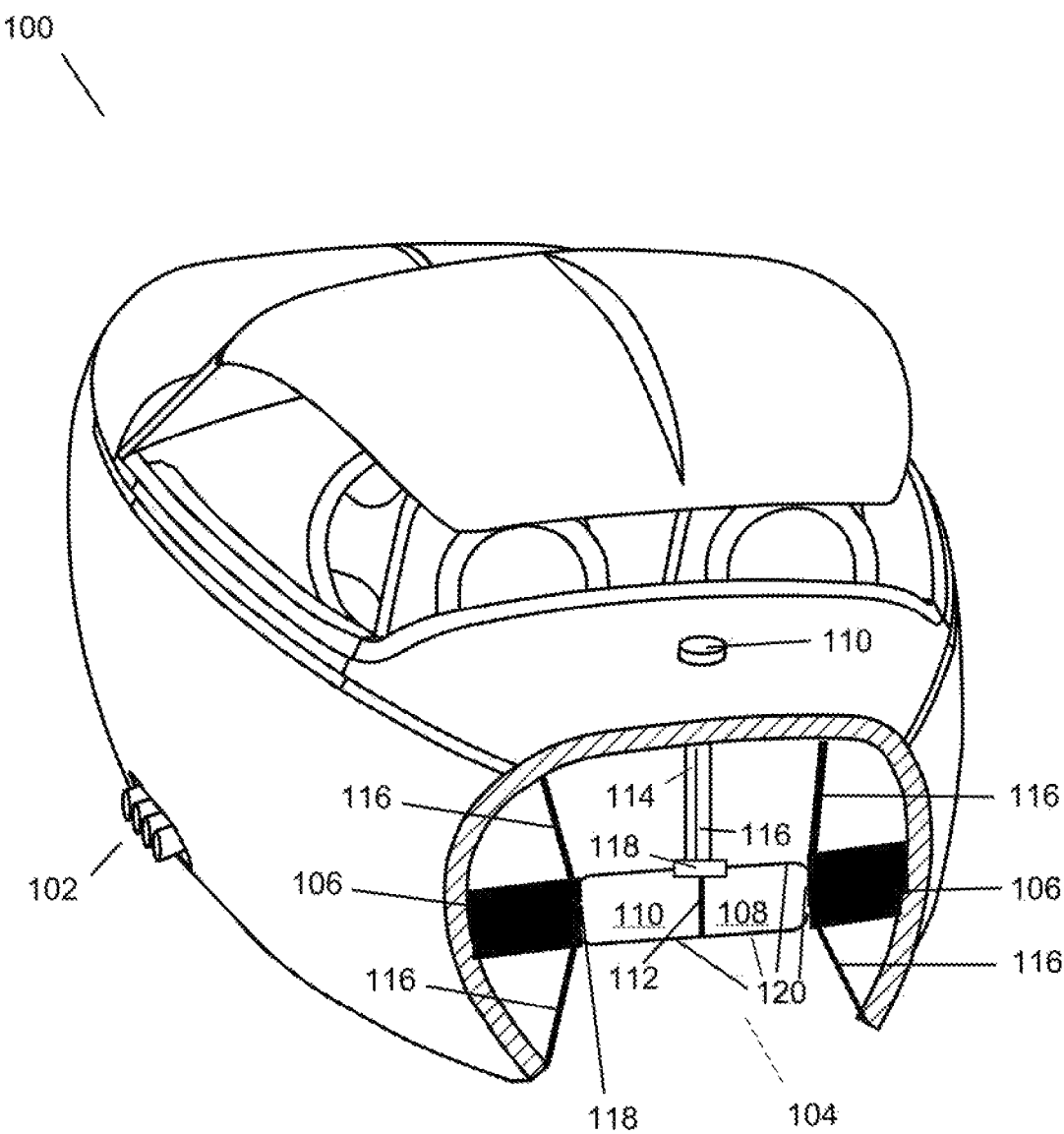
FIG. 1 is a perspective view showing one embodiment of a motorized vehicle which cleans CO2 out of the atmosphere and stores it in the fuel tank.

FIG. 1 shows a vehicle 100 which collects CO2 and/or other exhaust components in area 110 of fuel tank 104. Fuel tank 104 includes two storage areas 108 and 110. Storage area 108 may store a combustible fuel such as gasoline, diesel fuel, liquefied petroleum gas, liquefied natural gas, compressed natural gas, alcohol, butane, or hydrogen. The fuel stored in area 108 may be a compressed gas fuel or a liquid fuel. Storage area 110 may store compressed gas or liquefied gas. The compressed gas or liquefied gas stored in area 110 may have originated as a result of combustion of fossil fuels and/or as a naturally occurring gas product of the atmosphere. Fuel tank 104 is defined by walls 120. The walls 120 may be any shape and dimension which forms two or more inner areas 110 and 108. The inner areas are closed on all sides so as to form a box or cylinder or sphere. Areas 110 and 108 may be separated 112 by a fixed wall, a piston, baffle, metal wall, carbon fiber wall or bladder. Additional areas (not shown) may be located within fuel tank 104 with additional separators such as 112.

Frame elements 106 and 116 may be configured to support and enable tank 104 to be removable. Fuel tank 104 may be modularized and removable from a vehicle front, back, bottom, or side. Tank 104 may be replaced as a refueling and recycling procedure. A refueling and recycling procedure may be accomplished by a delivery driver. The delivery driver may provide mobile vehicle fueling and recycling based on a vehicle fuel state, CO2 fill state, or location. The delivery driver may be able to refill and recycle a vehicle fuel tank without a vehicle owner being present such as when a vehicle owner is at work or shopping or parked at home. The delivery driver may be given a dynamically generated code which generates access to the fuel tank of a vehicle. The dynamically generated code may have global positioning location coordinates (GPS location coordinates) concatenated onto or contained within the dynamically generated code. The code may enable access to a vehicle fuel tank and give a delivery drive GPS coordinates of the vehicle. If the vehicle moves, the dynamically generated code may also change in real-time allowing a delivery driver to track and obtain access to the vehicle fuel tank. A temporary access code for accessing the fuel system may be created using GPS coordinates of the vehicle and a random number generator. If the vehicle moves to a different coordinate the temporary access code may be dynamically changed based on a new GPS coordinate location. This may allow a different delivery driver or company to fill the refilling/recycling order. A delivery driver may be notified that a vehicle needs to be refueled when a vehicle is stationary for a predetermined time period. If a vehicle is traveling and does not have enough fuel to reach a desired destination a fuel delivery driver may be routed to an estimated point or rondeau point along a vehicle route. This may be useful especially for totally autonomous vehicles which need to be refueled by people or an automated system. A delivery driver may have replaceable fuel/recycling modules which can be swapped in less than 2 minutes at any location.

A fuel tank may store and supply more than one type of fuel. The fuel may be one or more of gasoline, diesel fuel, liquefied petroleum gas, liquefied natural gas, compressed natural gas, alcohol, butane, or hydrogen. One or more CO2 recycling tanks or bladders may be contained within the fuel tank. Separately removable pressurized tanks may be contained within a fuel tank. Fuel tank 104 may have fuel added and CO2 discharged at the same time by a dual nozzle-fueling/recycling pump connection 114 and 116 to fuel tank 104. A CO2 tank may be removable from the vehicle or fuel tank for recycling purposes. A pressurized fuel tank may be removable from the vehicle or fuel tank for fueling purposes.

A vehicle may collect CO2 from the vehicle's exhaust system 102 and compress the exhaust into a fuel tank of the vehicle or other dedicated CO2 storage area. A vehicle may collect atmospheric CO2 which is not the result of the vehicle's combustion and store the CO2 within a fuel tank of the vehicle or other dedicated storage area. A vehicle may collect CO2 from the vehicle's exhaust system and from atmospheric CO2 which is not the result of the vehicle's combustion and store the CO2 in the same CO2 tank within the fuel tank or to another dedicated CO2 storage area. The vehicle may store CO2 from the exhaust in a different CO2 storage from the CO2 collected which was not part of the vehicle's combustion process. The vehicle may provide dispensing of CO2 beverages within the vehicle from CO2 taken out of the vehicle's exhaust and/or out of the atmosphere which was not part of the vehicle's combustion process. The vehicle may provide one or more auxiliary CO2 ports for recycling or using collected CO2.

Figure 2A:
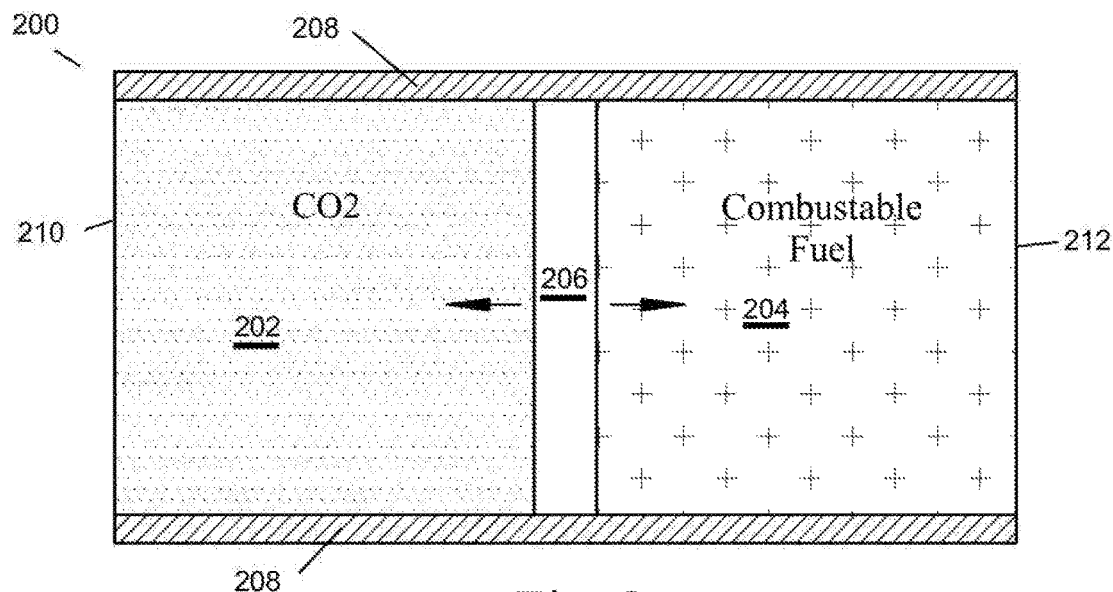
FIGS. 2a and 2b are cross-sectional views of fuel tanks in accordance with embodiments of the invention.
Figure 2B:
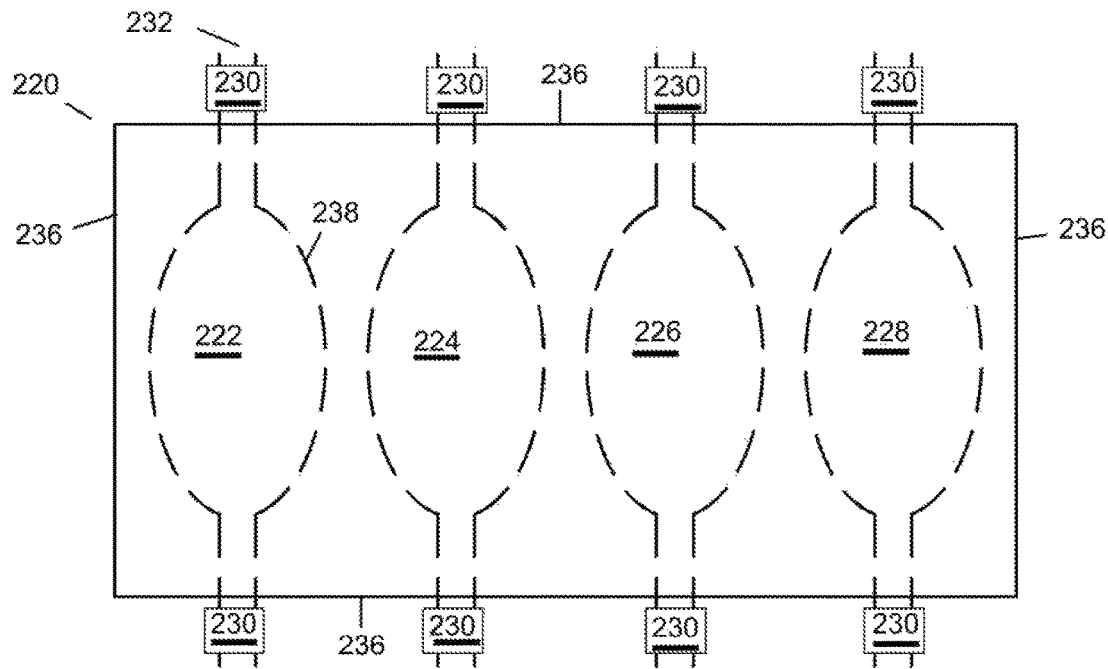

Now referring to FIGS. 2a and 2b. In FIG. 2a we see a fuel tank 200 with a movable piston 206. The movable piston 206 is shown with equal volume amounts CO2 202 and combustible fuel 202, thus the piston is in the middle of the fuel tank 200. As fuel is consumed, more CO2 is collected and added to area 202 and more fuel is taken away from area 204 moving the piston 206 closer to fuel tank end section 212. Fuel tank 200 is illustrated as a cylinder with a cross-section of the cylinder shown at 208. Although shown here as a cylinder, fuel tank 200 may be an shape which will allow a piston to seal and move such as a square or rectangle.

In FIG. 2b we are shown a fuel tank 220 with fixed areas 222, 224, 226, and 228. These fixed areas may be formed 236 in aluminum, steel, stainless steel, fiber reinforced carbon, carbon fiber, fiberglass, plastic, metal, or any other material which is able to hold necessary gas and liquid pressures of combustion fuels and exhaust gases. Form 236 may be part of a body of a vehicle or a removable section of a body panel of a vehicle. Form 236 may be part of a vehicle frame or a removable section of a vehicle frame. Fuel tank 220 includes quick connects 230 for quick connection of fuel tank 220 to a vehicle. Quick connections 230 may have valves such as one-way valves, check valves, or pressure regulators built into the quick connection 230. Additionally, quick connections 230 may have specific features which allow for connection to a vehicle or vehicle hoses in only one way. This may prevent lines from being attached to a wrong fuel or recycling hose or port. Areas 222, 224, 226, and 228 may each have different fuels, or collection gasses depending on a specific vehicle configuration. For example, a vehicle may have compressed natural gas stored in 222, nitrous oxide stored in 224, recovered CO2 stored in 226 and liquid nitrogen stored in 228 (for cooling purposes). In another example, a vehicle may have gasoline stored in 222, exhaust CO2 stored in 224, cleaner atmospheric CO2 stored in 226, and raw unprocessed exhaust stored in 228. The raw unprocessed exhaust gas in 228 may be temporarily stored while exhaust processing catches up with demand over its capacity. In another example, different quality of exhaust CO2 may be stored in different areas. High purity 99% CO2 may be stored in 228, 70% purity may be stored in 226 and 50% purity may be stored in 224, and diesel fuel may be stored in 222. A CO2 recovery system may temporally store lower purity CO2 in tanks for later reprocessing based on system demands and exhaust flow determinations. Each area may have one or more openings 232 and 234 for accessing individually areas 222, 224, 226, and 228. One of the openings may be for accessing liquid and one may be accessing gas. A gas side may be used for reprocessing impurities and separating out gasses with different vapor pressures. A liquid side may be for dispensing liquid products for recycling or for cooling purposes. A gas fuel side may be for feeding gas to a combustion engine in addition to purification and separation.

Figure 3:
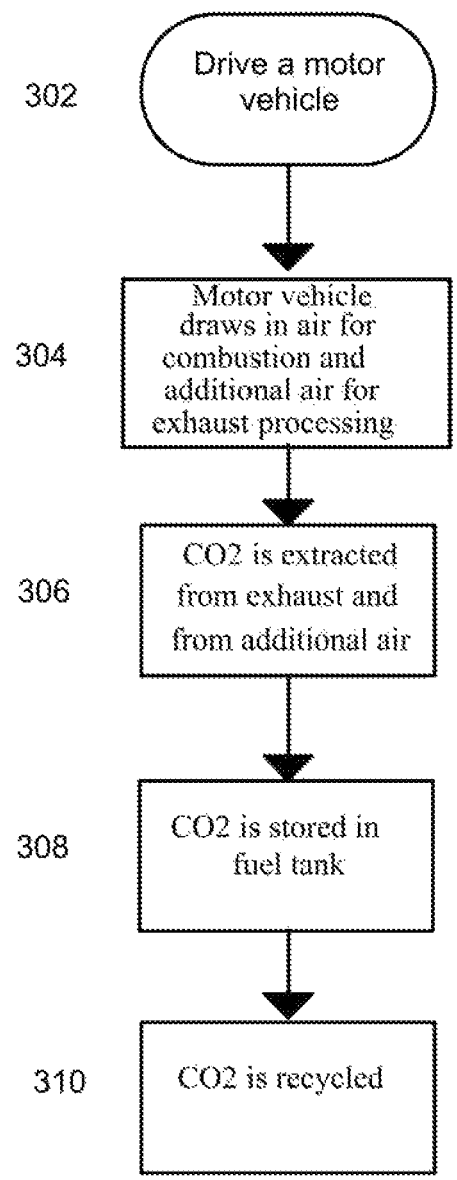
FIG. 3 is a simplified flow chart of how CO2 is removed from the atmosphere and recycled in accordance with an embodiment of the invention.

In FIG. 3 a simplified flow diagram showing how CO2 can be recycled by driving a vehicle. At step 302 a vehicle combustion engine is turned on. In step 304 the combustion engine draws in combustion air and additional air not used for combustion. In step 306, CO2 is extracted from the vehicle's combustion exhaust from burning combustion fuel obtained from the vehicle's fuel tank. CO2 is also extracted from the additional air not used for combustion. The extraction process is described in relation to FIGS. 4 and 6. The extracted CO2 is then stored in one or more CO2 tanks which may be located in the fuel tank of the vehicle. The CO2 is then discharged at a gas station or by a mobile gas delivery recycling service or by removing portable CO2 tanks or by connection to a portable CO2 tank or by dispensing CO2 beverages in the vehicle.

Figure 4:
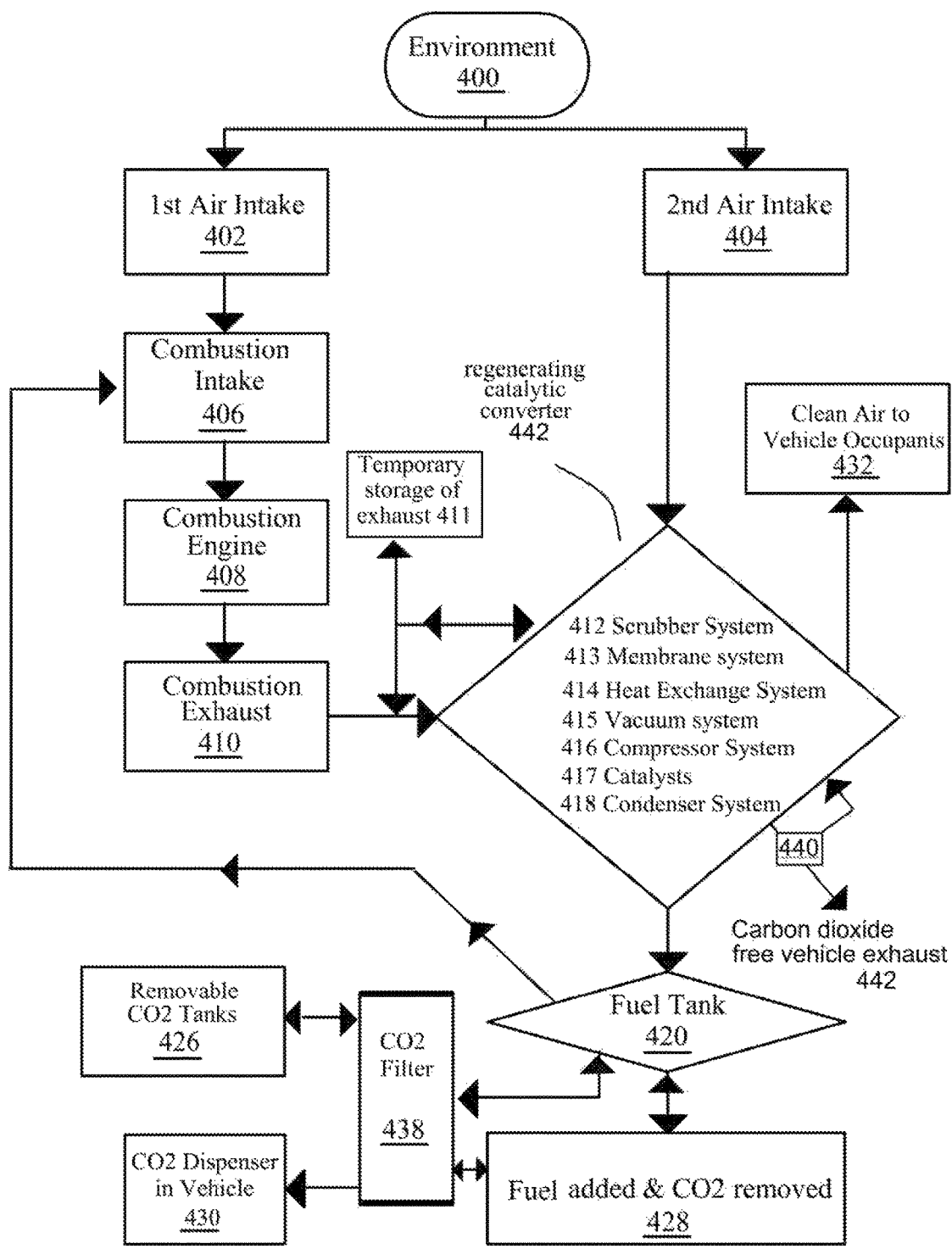
FIG. 4 is a detailed flow chart of how CO2 is removed from the atmosphere and recycled in accordance with an embodiment of the invention.

In FIG. 4, combustion engine 408 burns fuel from fuel tank 420 producing combustion exhaust 410. Combustion exhaust contains CO2 resulting from combusting fuel and from drawing in air from environment 400 which has 400 ppm of CO2 or greater. Exhaust 410 is received into CO2 recovery system 442. CO2 recovery system 442 can be thought of a regenerative catalytic converter for recovery of CO2. CO2 recovery system 442 also receives CO2 from environment 400 by way of a second air intake 404. The environment 400 is the ambient environment in which combustion engine 408 is operating while running. The second air intake 404 may be located toward the front of a vehicle so air may be pressured by way of movement of the vehicle as the vehicle moves forward. CO2 recovery system 442 may have one or more scrubbers 412 and/or membranes 413 for filtering and removing CO2 from other gases such as nitrogen and oxygen. Water may be used to collect and recover CO2 within a scrubber or membrane system. Heat may be used to release CO2 from water. One or more heat exchangers 414 may provide necessary heating and cooling of exhaust gases to process the removal and storage of CO2. On or more compressors 416 may be used to compress exhaust gasses. Compressors 416 may be used to compress exhaust into temporary storage 411. Temporary storage 411 is a staging area for exhaust gas and may be used when recovery system 442 has reached its maximum capacity or when additional cooling of the exhaust gas is needed before processing. Temporary storage 411 may be built into a carbon fiber body of a vehicle or a frame structure of a vehicle. Exhaust 411 may be stored in temporary storage 411 with relatively low pressures or may be compressed to higher pressures. Temporary storage may include one or more heat exchange systems for cooling the exhaust while in temporary storage. Use of temporary storage 411 may happen if a combustion engine is producing 2 liters per second at 6000 rotations per minute of exhaust and the scrubber can only handle 1.5 liters of exhaust per second then 0.5 liters per second may be diverted to temporary storage 411 until the rpms decrease below 4500 rpms. One or more compressors may also be used in stages to compress CO2 to a liquid state in order to remove oxygen and nitrogen and/or to store the CO2 in liquid form. For example, a compressor may compress raw exhaust in a first stage to 500 psi and then send the hot gas through a heat exchange system 414 and condenser system 418 and then into a second compressor for a second stage compression to 800 psi and then through another heat exchange and condensation stage and into a third compressor for third stage compression into liquid CO2. An accumulator (not shown) may be used separate liquid CO2 from oxygen gas and nitrogen gas before storage into tank 420. Alternatively, a CO2 area of fuel tank 420 may be used as an accumulator and a solenoid valve attached to a gas side of the CO2 area of fuel tank 420 may be used to remove oxygen and nitrogen from liquid CO2. In another method one or more compressors 416 may compress CO2 gas from a scrubber 412 and/or membrane system 413 directly into a designated CO2 area of fuel tank 420. When the CO2 area reaches a predetermined pressure, a second compressor may take over compressing or assist in compressing CO2 into fuel tank 420. One or more condenser systems 418 may be used to condense liquids and remove heat from exhaust gases. Diverter system 440 includes one or more CO2 sensors for detecting CO2 parts per million before allowing the exhaust to exit CO2 recovery system 442. If the parts per million of CO2 is not within an allowable range then exhaust may be diverted and reprocessed or directly compressed into a storage tank for later processing. Compressors 416 may be a combination of electrical and mechanical compressors to achieve the desired results. It is contemplated that multiple compressors may be used in at the same time to achieve full recovery of CO2. Recovery system 442 may use multiple recovery method at the same time. For example, a dual stage scrubber may be scrubbing exhaust, while multiple membranes are filtering CO2 from other exhaust, and while one or more compressors are pumping raw exhaust into a storage location, pumping partially processed CO2 into another location and compressing fully processed CO2 into another location all at the same time. CO2 absorbers may be used in connection with temporary storage 411, fuel tank 420, compressor system 416, scrubber system 412 and membrane system 413. For example, a CO2 absorption catalyst 417 may be used to create reaction with water to absorb CO2. A compressor vacuum 415 or heat may then be used to extract the CO2 from the water. Calcium hydroxide, sodium and potassium are examples of regenerating catalysts that may be used and reused, other well-known CO2 absorption catalysts may also be used. A regenerating catalytic converter may by formed by using catalysts in combination with CO2 membranes, scrubbers, and compressor/vacuum systems.

Fuel tank 420 receives and/or stores CO2 in gas and/or liquid phase. Fuel tank 420 also receives and stores combustion fuels for fueling engine 408. One or more CO2 filters 438 may be used to further purify CO2 for consumption or recycling. Additional CO2 tanks 426 may be used to extract CO2 from the fuel tank 420 for recycling. Tanks 426 may connect to an auxiliary CO2 connection allowing transfer of compressed or liquid CO2 to tanks 426. Tanks 426 may be installed in a trunk of a vehicle and may be removed and replaced as needed. Tanks 426 may also be located at a gas station and when fuel is added to tank 420 CO2 may also be removed at the same time or before fuel is added.

Figure 5:
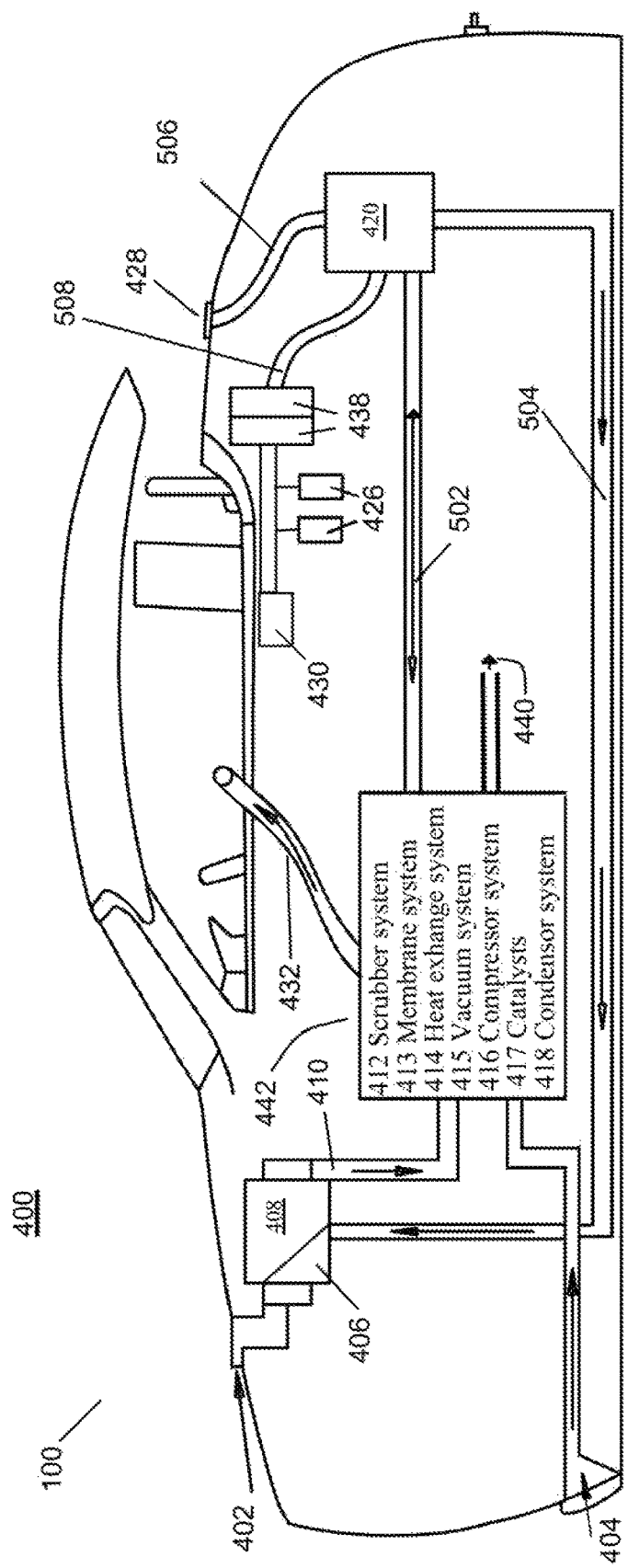
FIG. 5 is a side view of one embodiment of a vehicle in accordance with an embodiment of the invention.

Now referring to FIG. 5, a vehicle 100 is shown with the CO2 recovery system of FIG. 4 installed. Here we see four lines going into fuel tank 420. Line 508 is a CO2 line out of the fuel tank 420. Line 508 feeds auxiliary port 430 and installed portable tanks 426 after going through filters 438. Lines 506 are dual purpose lines and may contain multiple individual lines for filling fuel into fuel tank 420 and removing CO2 or other raw exhaust from fuel tank 420. Multiple types of fuels may be filled through lines 506. Lines 502 are input/output lines into fuel tank 420 and may contain multiple separate lines such as CO2 line inputs, CO2 line outputs, raw exhaust inputs, raw exhaust outputs, vacuum lines, etc. Lines 504 may contain multiple individual lines also for multiple type of fuel and fuel return lines.

Figure 6:
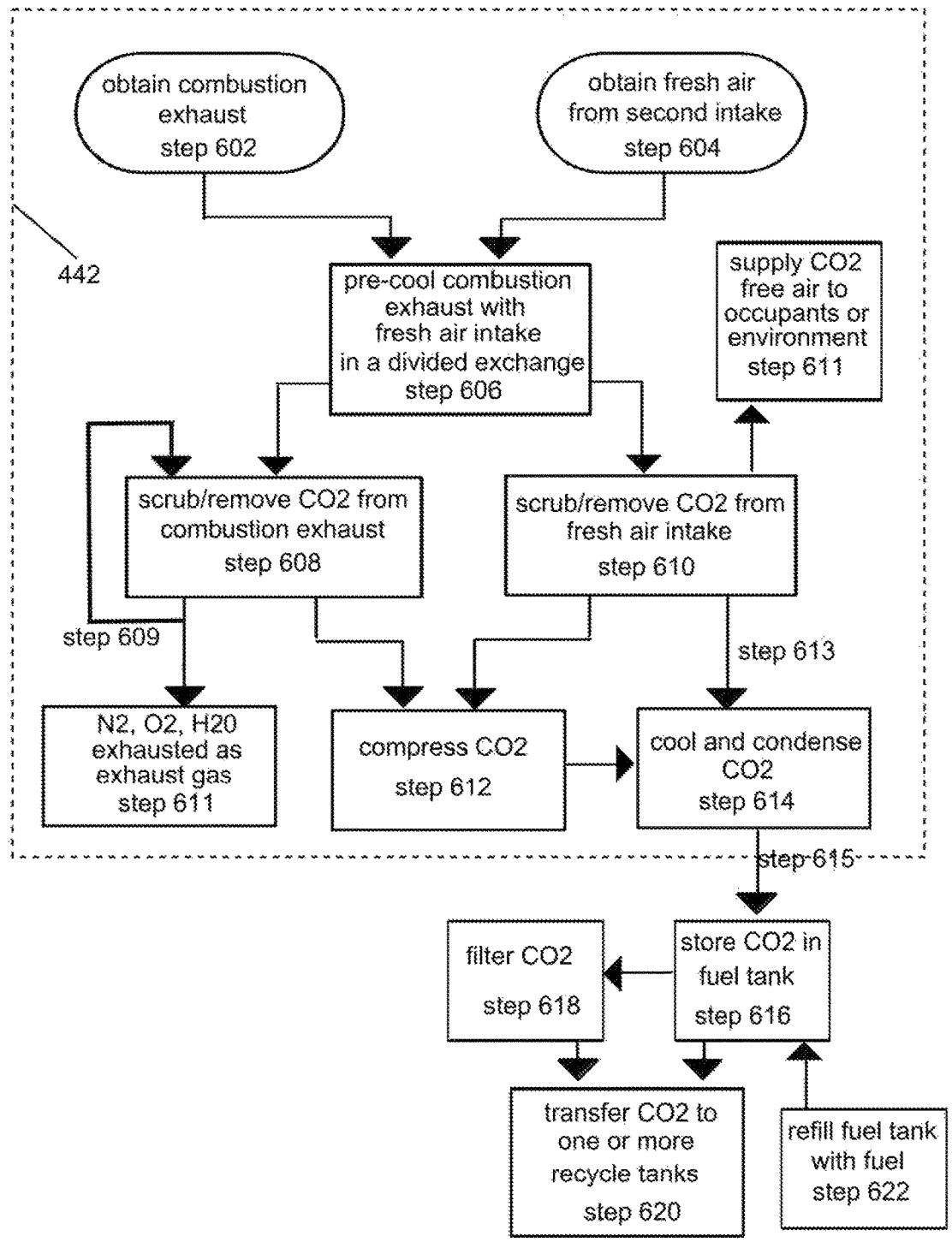
FIG. 6 is a detailed flow chart of how CO2 is removed from the atmosphere and recycled in accordance with an embodiment of the invention.

FIG. 6 shows a detailed process by which CO2 may be removed from exhaust gas. At step 609 a determination is made as to the CO2 concentration of the exhaust gas and is reprocessed if the CO2 level is not within a desired range or predetermined threshold. Step 608 may include the use of catalysts, one or more vacuum pumps, compressors, membranes, heat exchanges, and condensers. In step 611 clean air free of CO2 may be provided to occupants of the vehicle. In step 606 fresh air from step 604 may be kept in a sealed system separate from exhaust 602 while providing a heat exchange function to cool the exhaust from step 602. Additional fresh air cooling 604 may be used for multiple stage cooling and heat exchange systems and to remove heat caused by catalysts and to cool compressors, condensers, and vacuum pumps.

Figure 7:
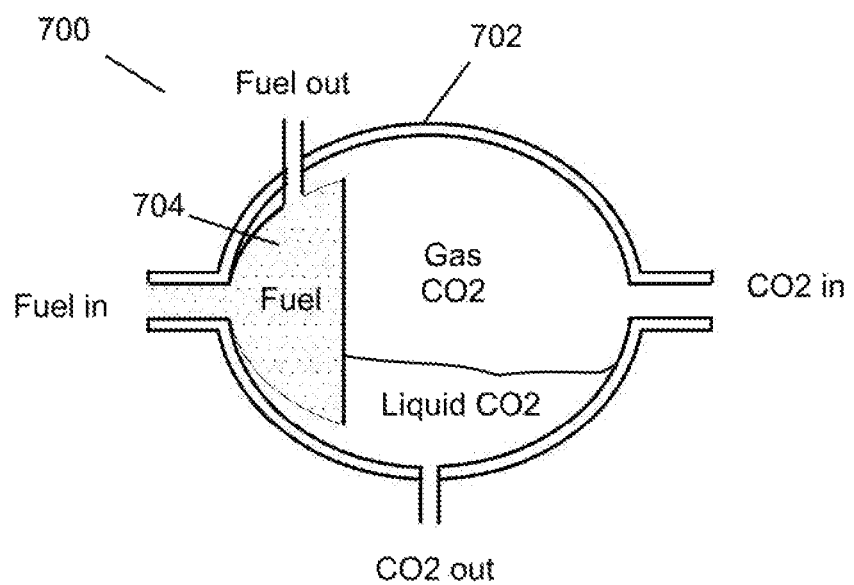
FIG. 7 is a side view of one embodiment of a fuel tank in accordance with the invention.

FIG. 7 shows a fuel tank 700 with a fuel bladder 704 and a CO2 collection area which is formed by fuel tank perimeter 702. In this example fuel bladder 704 expands when filled to consume most of the inside area of tank 700. Before bladder 704 is filled CO2 is removed through CO2 out. As CO2 starts to build up in tank 700 it provides additional pressure to bladder 704 thus increasing the pressure of the fuel within the bladder.

Figure 8A:
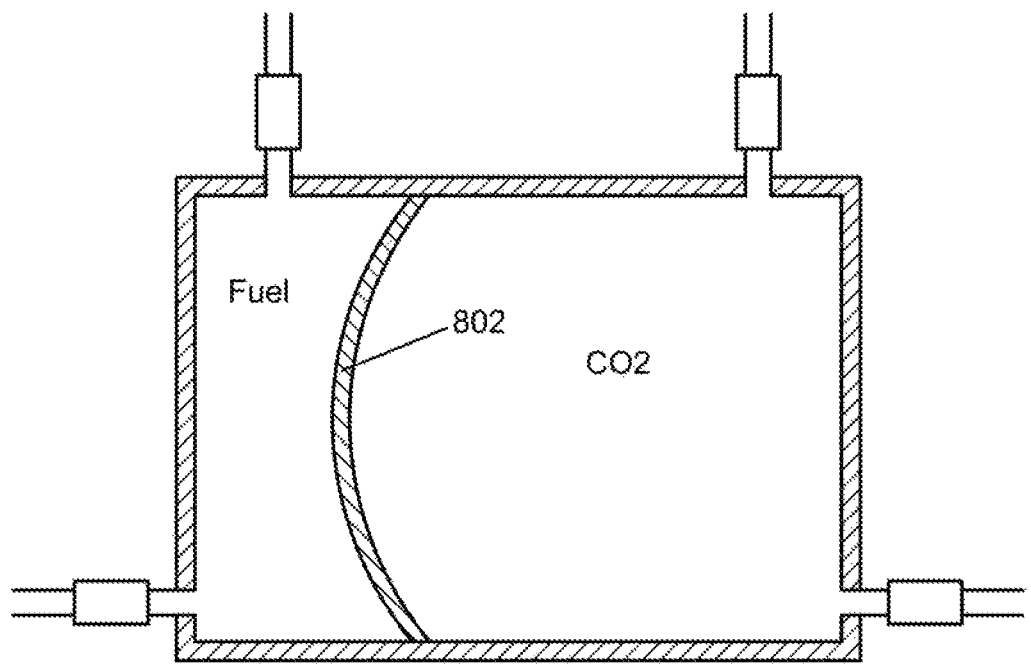
FIGS. 8a and 8b are side views of one embodiment of a fuel tank in accordance with the invention.
Figure 8B:
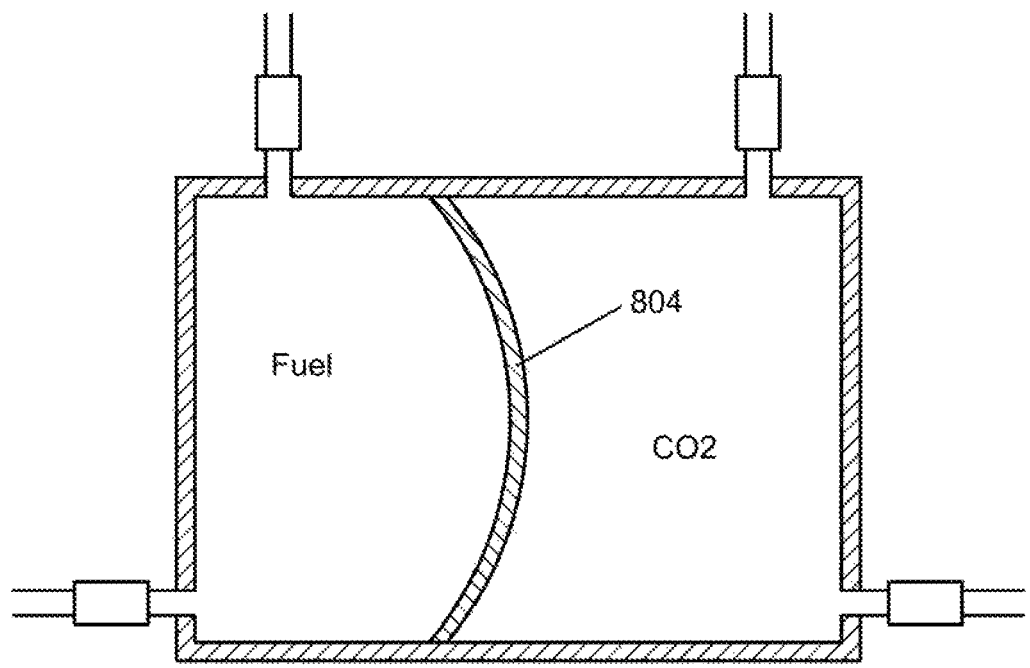

FIGS. 8a and 8b show a baffle 802 and 804 in different positions based on an amount of fuel and CO2 in each of the fuel tanks. It is noted that a different fuel is in 8b compared to 8a.

Figure 9:
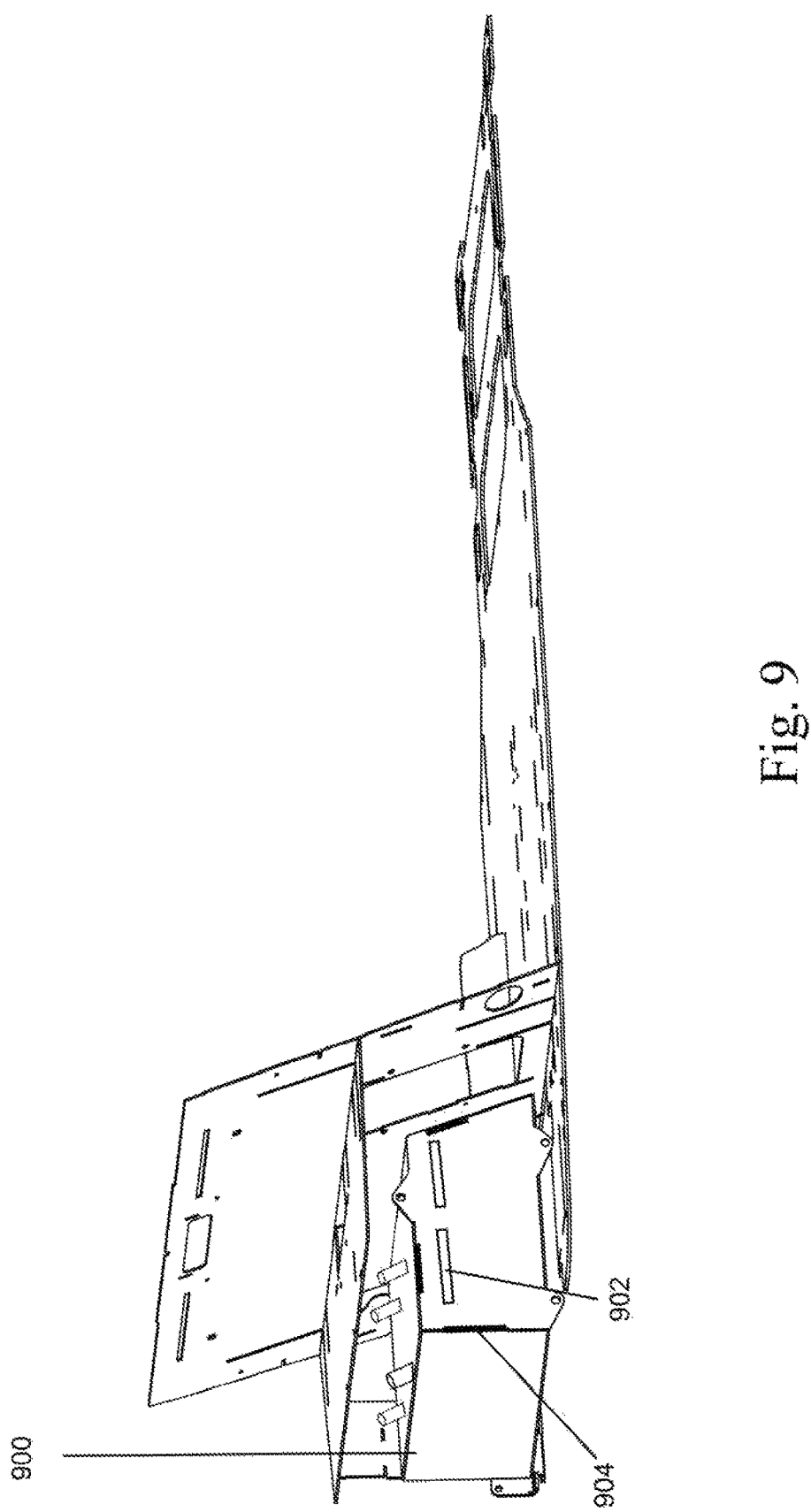
FIG. 9 is a perspective view of one embodiment of a fuel tank in accordance with the invention.

FIG. 9 shows a modular fuel tank 900 which connects to a frame structure of a vehicle 100. This modular tank is removable and depicts removal guides at 902. A hinge 904 is shown for inspection and maintenance of tanks or bladders within the fuel tank.

Figure 10A:
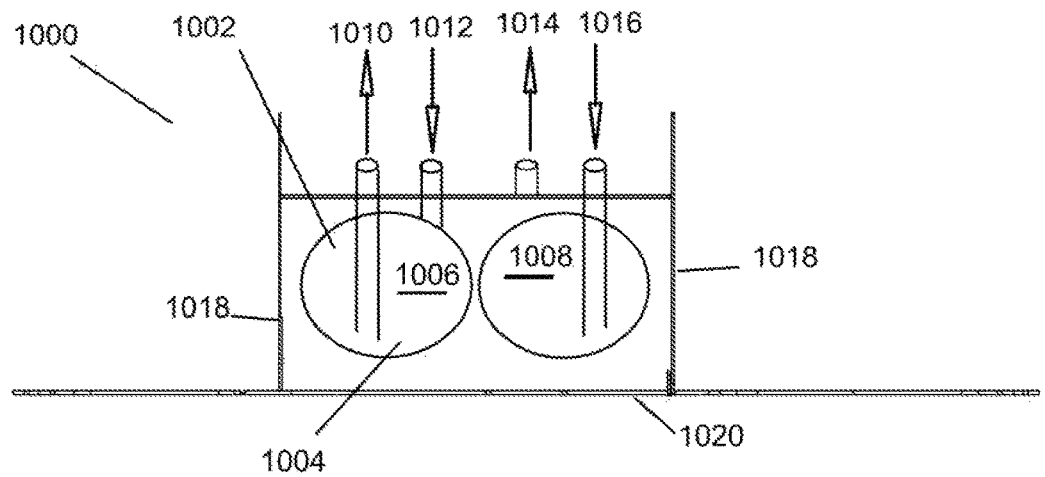
FIGS. 10a and 10b are configurations of fuel tanks in accordance with the invention.
Figure 10B:
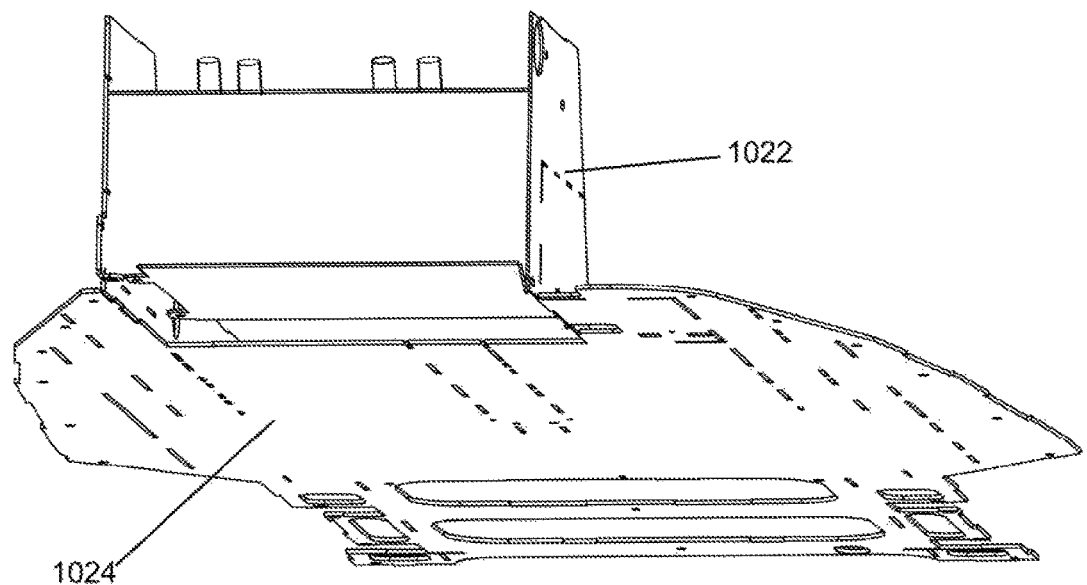

FIGS. 10a and 10b also show a modular fuel tank 1000 of vehicle 100. In FIG. 10a the access door is removed from fuel tank 1000 revealing cylindrical tanks 1006 and 1008 within fuel tank 1000. Cylindrical tanks 1006 and 1008 both have access tubes which draw from a top portion 1002 and a bottom portion 1004 of each tank. The bottom portion is accessed by tubes which extend to the bottom portion of each tank and may be used for liquid access. The other shorter tubes may be used to draw gas from a top portion of each tank. The fuel tank 1000 is defined by base plate 1020, walls 1018 and the other top and sides of the fuel tank.

FIG. 10b shows fuel tank 1000 of FIG. 10a interconnecting with a base frame base plate 1024 of vehicle 100 of FIG. 1. Side 1022 contains interface components allowing for removal and replacement of fuel tank 1000.

FIG. 11 shows fuel tank 1000 installed on frame base plate 1024 of FIG. 10b.

FIG. 12 shows a removable circular fuel tank 1202 installed on frame base plate 1024.

Figure 13:
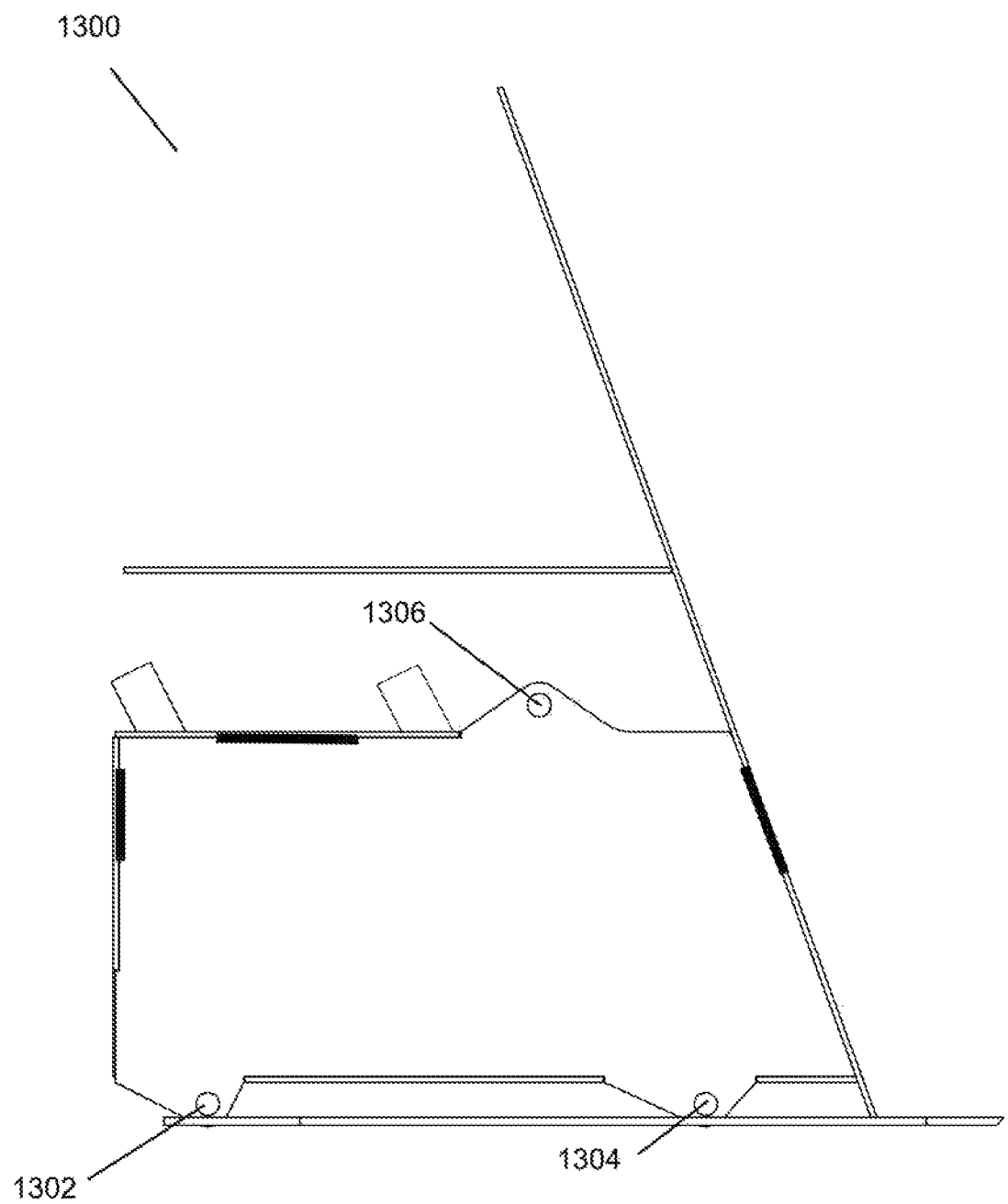

FIG. 13 shows another modular fuel tank with removal holes 1302, 1304, and 1306 for removing and replacing the fuel tank upon refueling and/or recycling CO2.

Figure 14:
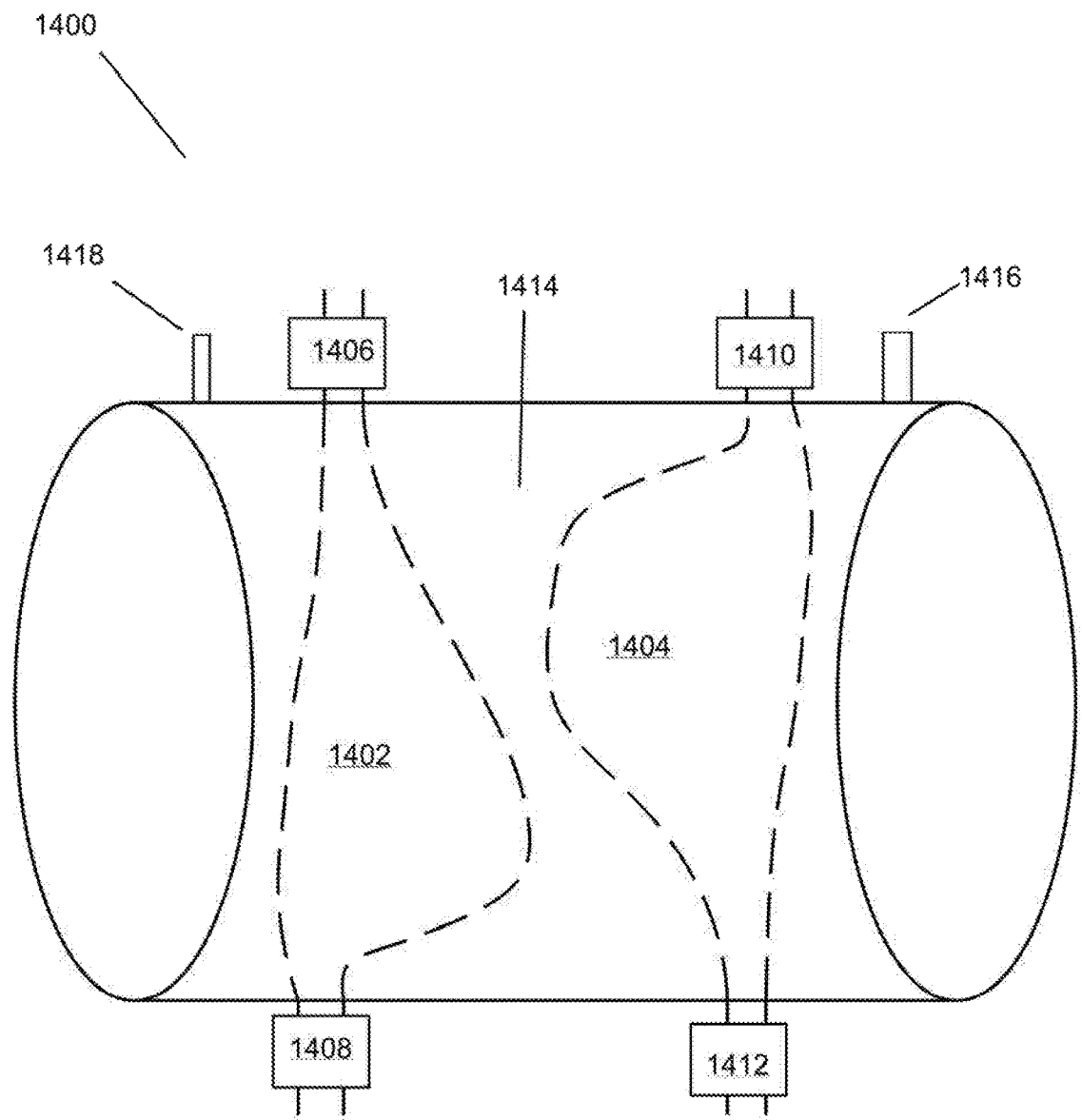

FIG. 14 shows a cylindrical fuel tank 1400 with two bladders 1402 and 1404. Bladders 1402 and 1404 may contain combustible fuel or exhaust gas. Area 1414 may also be used to store combustible fuel or exhaust gas. Connections 1406, 1408, 1410, and 1412 may be used as a quick connect for attaching and detaching bladders 1402 and 1404. Connections 1406, 1408, 1410, and 1412 may also include various types of regulators, pressure relief valves, check valves, etc., for controlling liquids and gasses. Ports 1416 and 1418 are for accessing area 1414 of fuel tank 1400 and may serve as a third area of fuel tank 1400. Bladders 1402 and 1404 may serve as first and second areas within Fuel tank 1400. Fuel tank 1400 is defined by the perimeter of its cylindrical shape.

Figure 15A:
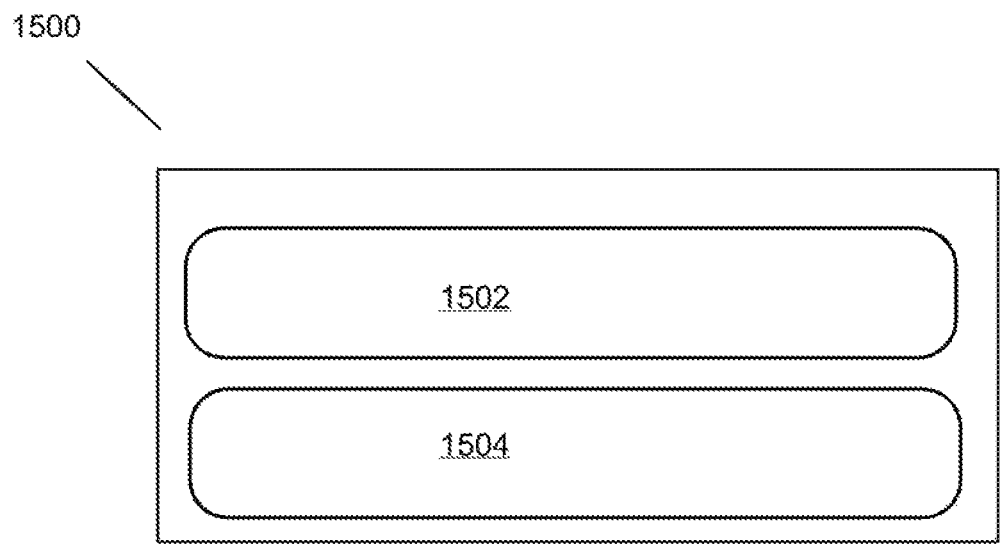
Figure 15B:
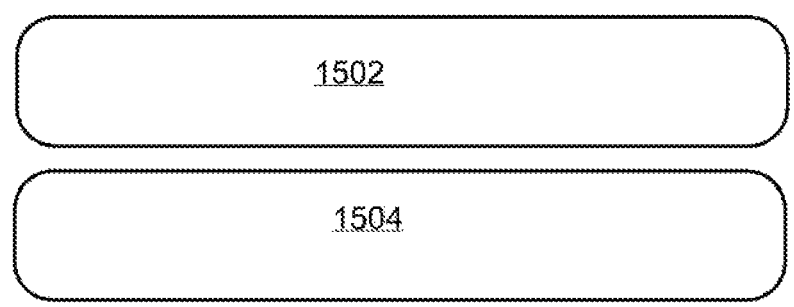

FIGS. 15a and 15b show separate tanks 1502 and 1504. Fuel tank 1500 contains separate tanks 1502 and 1504 which may be used to individual store fuel and vehicle exhaust gas. The fuel tank 1500 being defined by an enclosure which surrounds and protects the tanks on all sides with access ports for filling and refilling each tank. Such an enclosure may include a trunk of a vehicle or other vehicle storage area. FIG. 15a shows one of the sides of the fuel tank removed or opened so we can see the tanks inside.

FIG. 15b shows the same tanks removed out of fuel tank 1500 for inspection and servicing. With the tanks removed it is easy to refill or replace the tanks for refueling and recycling purposes.

Figure 16A:
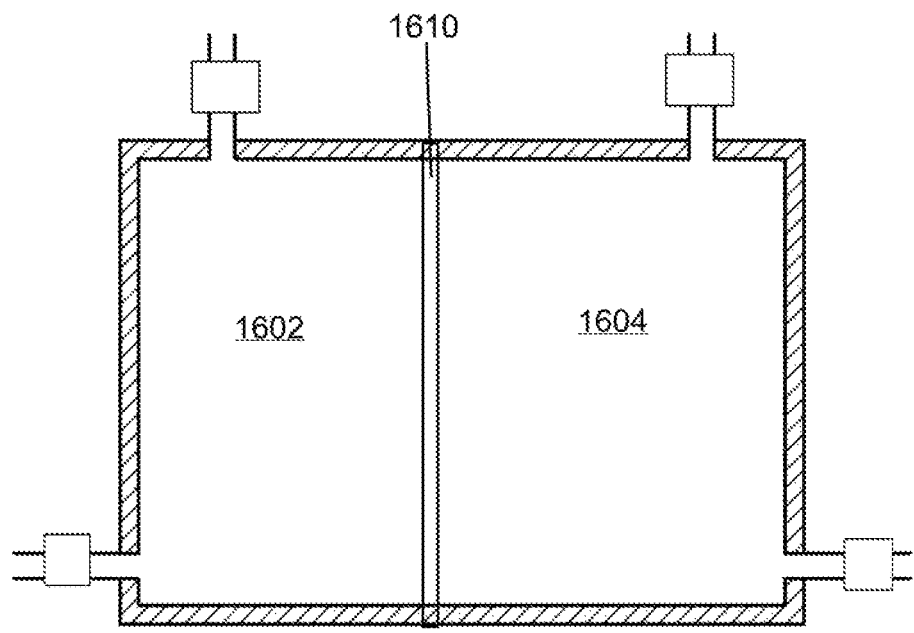
Figure 16B:
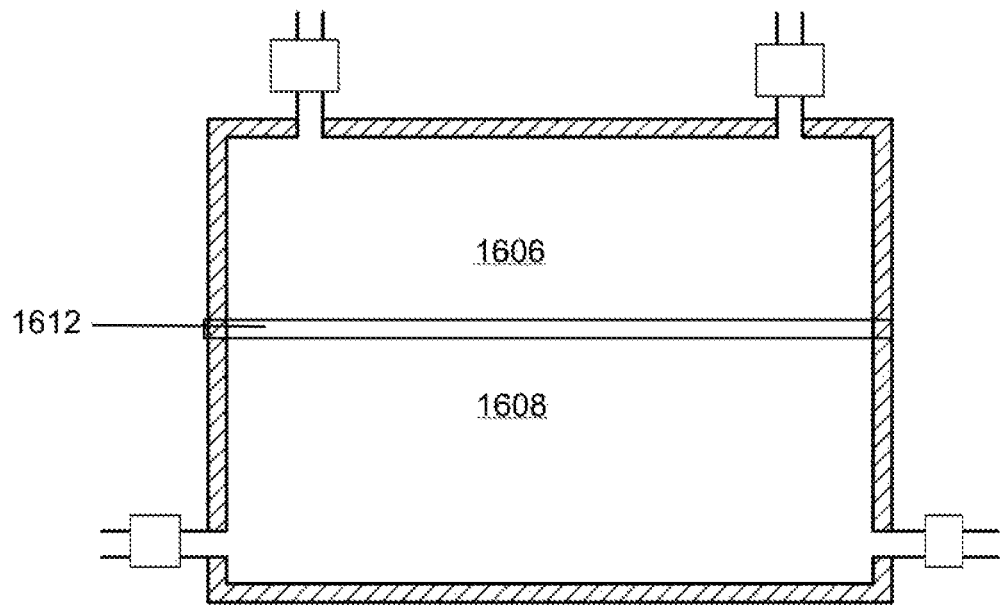

FIGS. 16a and 16b show variations of fuel tanks with fixed dividers 1610 and 1612 within the fuel tank for dividing exhaust gas storage and combustion fuel storage.

Figure 17:
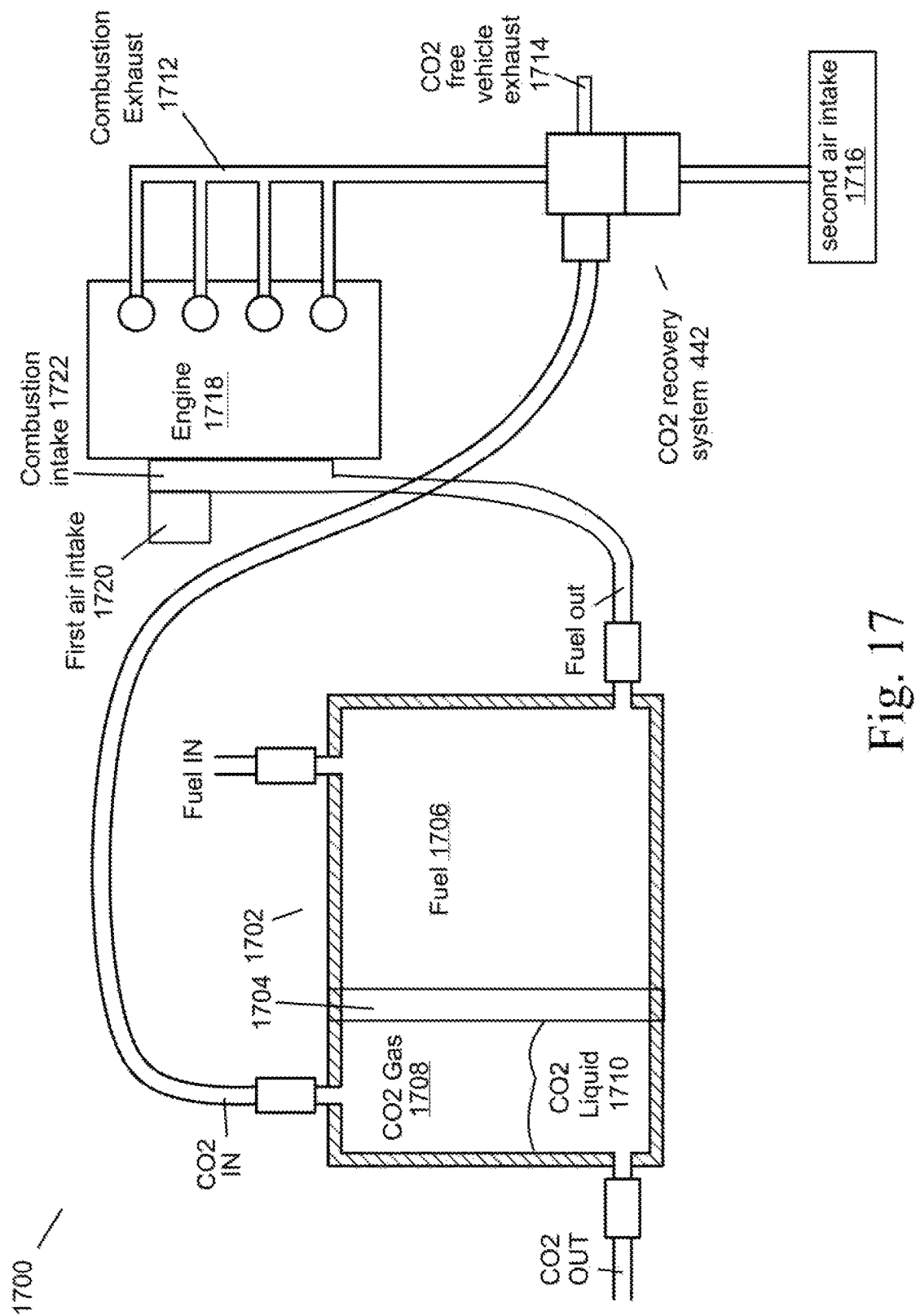
FIG. 17 is a simplified schematic diagram of CO2 recovery and storage in accordance with the invention.

FIG. 17 shows a simplified schematic diagram of a CO2 recovery system of the present invention. Here regenerating catalytic converter CO2 recovery system 442 is processing both combustion exhaust 1712 and fresh air intake 1716 to provide CO2 free exhaust 1714. Fixed partition 1704 is used to divide the recovered CO2 1708 from the combustion fuel 1706.

Figure 18:
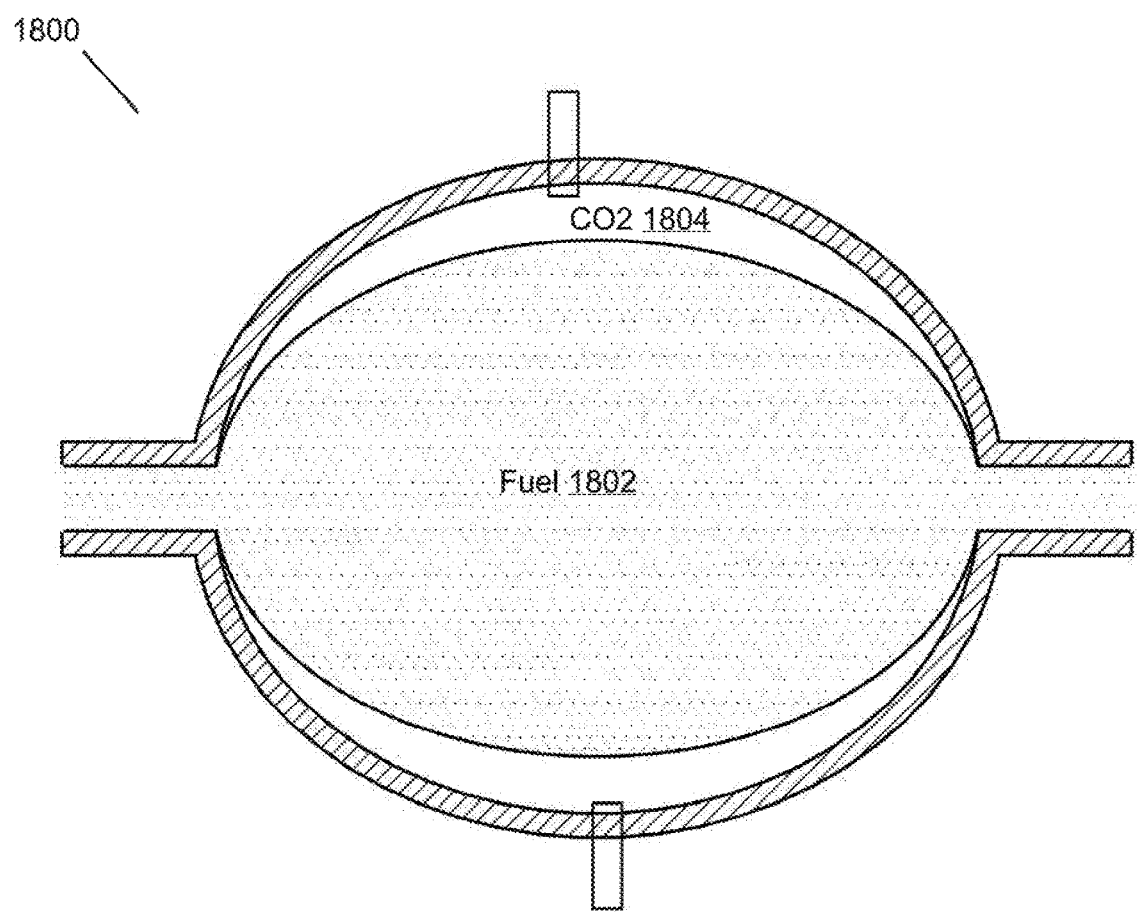
FIGS. 18, 19, 20a and 20b show various configurations of fuel tanks in accordance with the invention.

FIG. 18 shows a variation of a cylindrical fuel tank 1800 with a bladder used to divide the exhaust gas 1804 storage and combustion fuel storage 1802.

Figure 19:
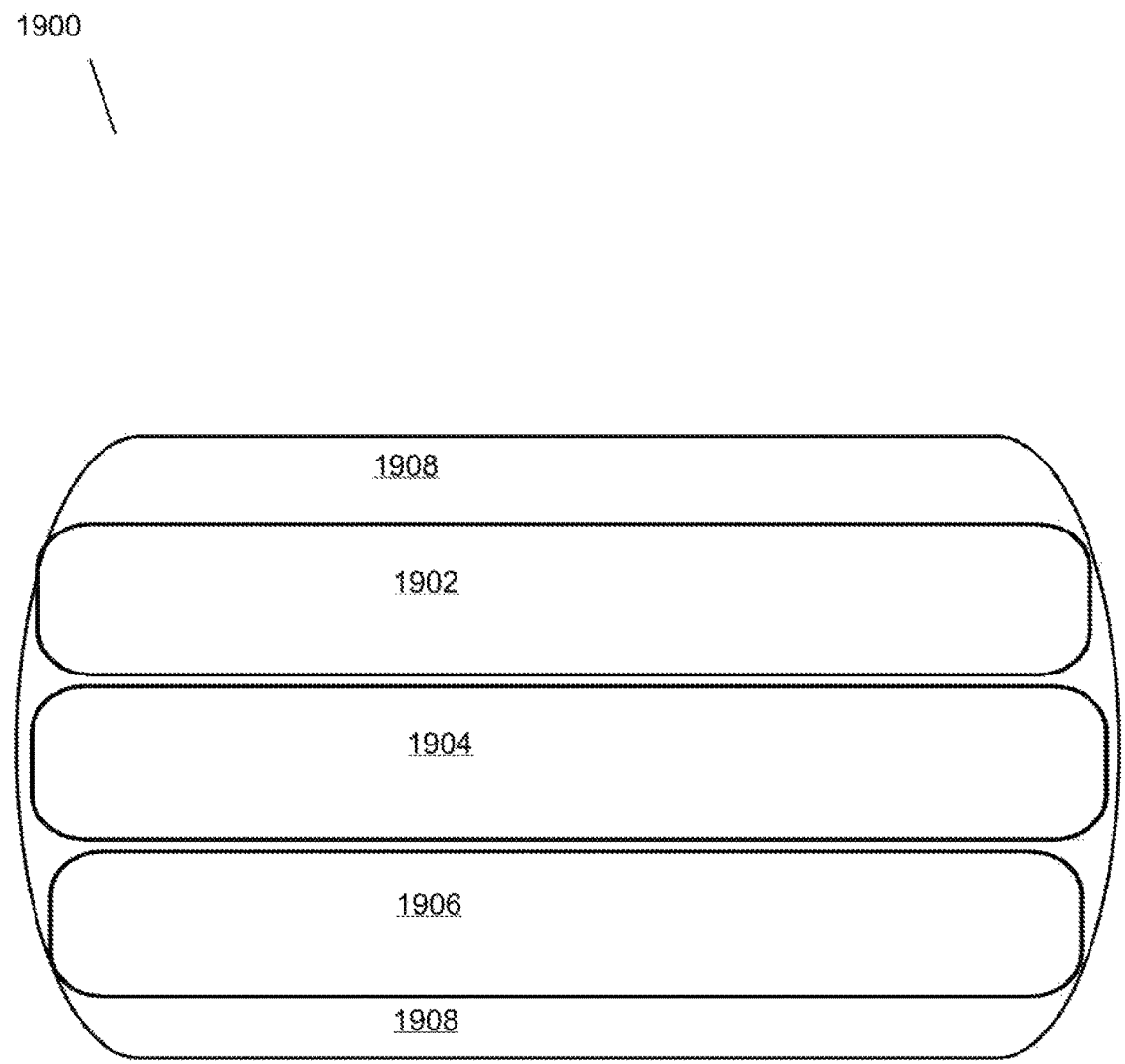

FIG. 19 shows a variation of a multiple cylindrical fuel tank 1900 with solid cylinders 1902, 1904 and 1906 contained within fuel tank 1900. Area 1908 may serve as an additional fuel or exhaust gas storage area or may alternatively, serve as a secondary protective structure for protecting the tanks within and for protection against accidental leakage of the tanks within. The eternal shape of the fuel tank 1900 may be round or square or any other shape which allow for holding the tanks within.

Figure 20A:
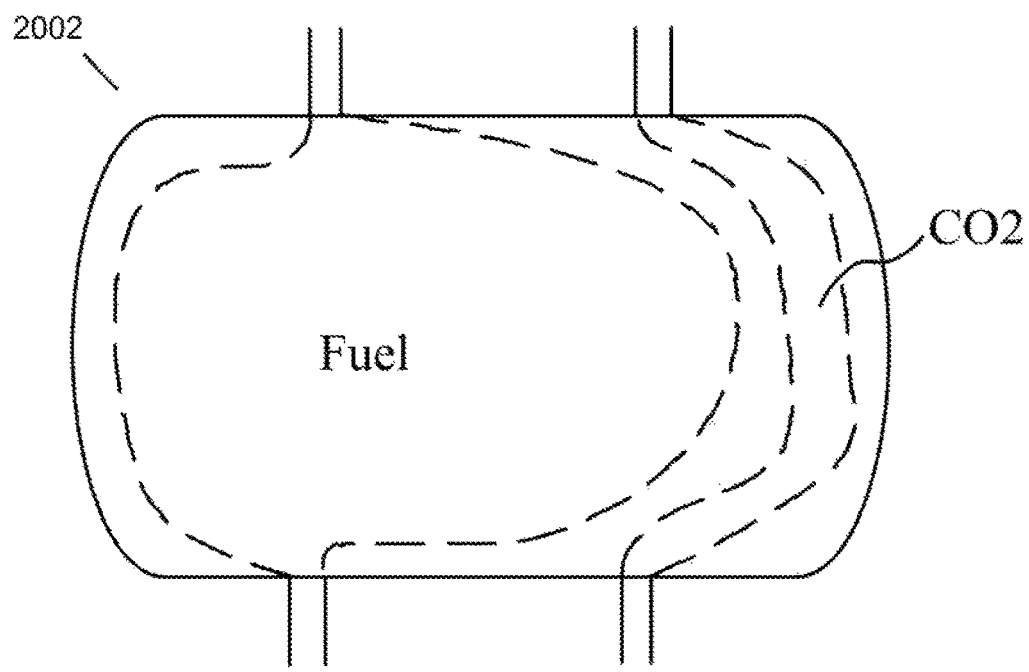
Figure 20B:
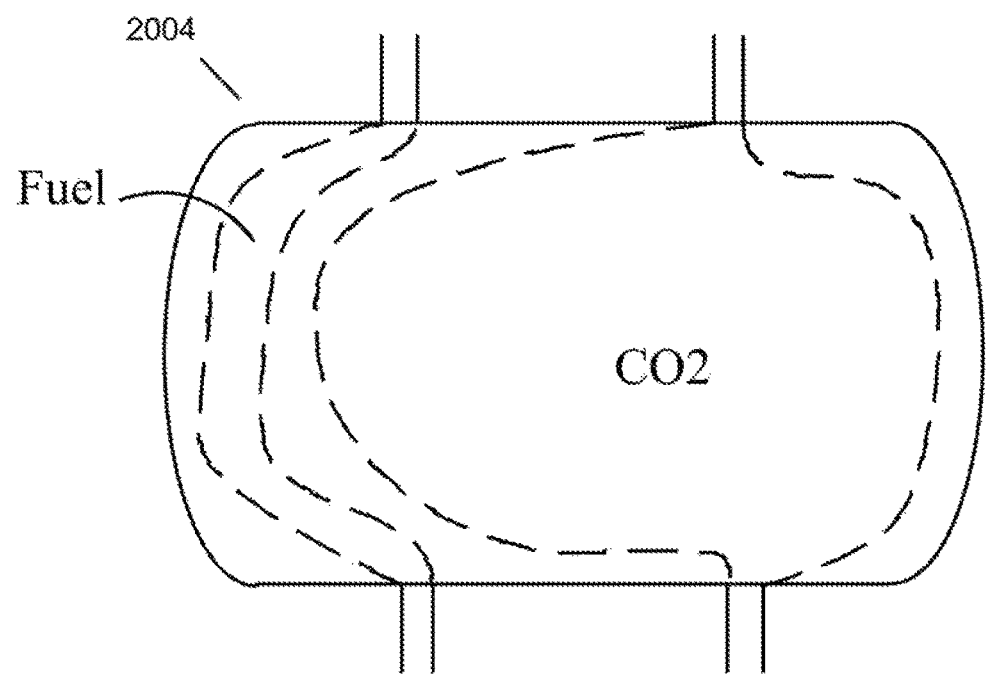

FIGS. 20a and 20b show variations of fuel tanks 2002 and 2004 with bladders used to divide the exhaust gas storage and combustion fuel storage. In FIG. 20a we see that the combustible fuel was recently refilled and the CO2 recently recycled. In FIG. 20b we see that the vehicle is nearly out of fuel and the CO2 needs to be recycled.

The fuel tank and methods disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A fuel tank comprising:
   a first storage area for storing a first combustible fuel;
   a second storage area for storing exhaust components resulting from burning the first combustible fuel;
   a piston disposed intermediate the first and second storage areas for expanding and contracting the respective storage areas, wherein
   the first storage area and the second storage area and the piston share volumetric space within the fuel tank.

2. The fuel tank of claim 1 further comprising pistons, baffles, metal walls, carbon fiber walls or bladders which separates the first storage area from the second storage area within the shared volumetric space.

3. the fuel tank of claim 2, wherein the shared volumetric space is defined by an inner area of an enclosed space or an outer perimeter of the enclosed space.

4. The fuel tank of claim 3, wherein the enclosed space is at least partially made of at least one of a plastic, carbon fiber, nylon, polyvinylidene fluoride, polyethylene, metal, or a metal alloy.

5. The fuel tank of claim 4, wherein the enclosed space is integrally formed into a body structure of a vehicle.

6. The fuel tank of claim 4, wherein the enclosed space is integrally formed into a frame structure of a vehicle.

7. The fuel tank of claim 4, wherein the inner area of the enclosed space is lined with one or more membranes.

8. The fuel tank of claim 1, further comprising a third storage area.

9. The fuel tank of claim 8, wherein a second combustible fuel is stored within the third storage area.

10. The fuel tank of claim 9, wherein the second combustible fuel is chosen from: nitrous oxide, gasoline, diesel fuel, liquefied petroleum gas, liquefied natural gas, compressed natural gas, alcohol, butane, or hydrogen.

11. A fuel tank method comprising:
providing a first storage area for storing a first combustible fuel;
providing a second storage area for storing exhaust components resulting from burning the first combustible fuel;
providing a piston disposed intermediate the first and second storage areas for expanding and contracting the respective storage areas,
wherein the first storage area and the second storage area and the piston share volumetric space within the fuel tank.

12. The method of claim 11, further comprising providing pistons, baffles, metal walls, carbon fiber walls or bladders which separates the first storage area from the second storage area within the shared volumetric space.

13. The method of claim 12, wherein the shared volumetric space is defined by an inner area of an enclosed space or an outer perimeter of the enclosed space.

14. The method of claim 13, wherein the enclosed space is at least partially made of at least one of a plastic, carbon fiber, nylon, polyvinylidene fluoride, polyethylene, metal, or a metal alloy.

15. The method of claim 14, wherein the enclosed space is integrally formed into a body structure of a vehicle.

16. The method of claim 14, wherein the enclosed space is integrally formed into a frame structure of a vehicle.

17. The method of claim 14, wherein the inner area of the enclosed space is lined with one or more membranes.

18. The method of claim 11, further comprising a third storage area.

19. The method of claim 18, wherein a second combustible fuel is stored within the third storage area.

20. The method of claim 19, wherein the second combustible fuel is chosen from: nitrous oxide, gasoline, diesel fuel, liquefied petroleum gas, liquefied natural gas, compressed natural gas, alcohol, butane, or hydrogen.

* * * * *